(12) United States Patent
Wiest et al.

(10) Patent No.: US 11,426,764 B2
(45) Date of Patent: Aug. 30, 2022

(54) ULTRASOUND TRANSDUCER

(71) Applicant: Endress+Hauser Flowtec AG, Reinach (CH)

(72) Inventors: Achim Wiest, Weil am Rhein (DE); Sascha Grunwald, Steinen (DE); Oliver Brumberg, Rheinfelden (DE)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 475 days.

(21) Appl. No.: 16/615,954

(22) PCT Filed: May 9, 2018

(86) PCT No.: PCT/EP2018/062025
§ 371 (c)(1),
(2) Date: Nov. 22, 2019

(87) PCT Pub. No.: WO2018/219613
PCT Pub. Date: Dec. 6, 2018

(65) Prior Publication Data
US 2020/0171539 A1  Jun. 4, 2020

(30) Foreign Application Priority Data

May 29, 2017 (DE) .................. 10 2017 111 624.9

(51) Int. Cl.
*G01F 1/66* (2022.01)
*G01F 1/667* (2022.01)
(Continued)

(52) U.S. Cl.
CPC .............. *B06B 1/067* (2013.01); *G01F 1/662* (2013.01); *G01F 1/667* (2013.01);
(Continued)

(58) Field of Classification Search
CPC ......... B06B 1/067; G01F 1/662; G01F 1/667; G01F 23/2968; G01S 7/521; G01S 15/08; G01S 15/58; G01S 15/88; G10K 11/004
(Continued)

(56) References Cited

U.S. PATENT DOCUMENTS 4,869,768 A    9/1989 Zola
5,146,435 A *  9/1992 Bernstein ............... G01H 11/06
                                                            381/174
(Continued)

FOREIGN PATENT DOCUMENTS

AU          4174900 A    10/2000
CN        102989654 A     3/2013
(Continued)

*Primary Examiner* — Jacques M Saint Surin
(74) *Attorney, Agent, or Firm* — Kelly J. Smith; Endress+Hauser (USA) Holding Inc.

(57) ABSTRACT

The present disclosure relates to an ultrasound transducer having at least one transducer element for sending or receiving ultrasound signals. The ultrasound transducer includes a matching element acoustically coupled to the transducer element that is designed to ensure acoustic matching between the transducer element and a medium that acts on the matching element. In a first subregion of the axial extent, the matching element partially fills each cross section of the matching element, and a filling component in the first subregion along the first longitudinal axis monotonically increases in the direction of the first side. The matching element has a plurality of ring elements in the first subregion arranged concentrically around the first longitudinal axis. Each ring element partially fills each cross section in the first subregion, wherein the first subregion comprises at least 80% of an axial extent of the matching element along the first longitudinal axis.

15 Claims, 4 Drawing Sheets

(51) Int. Cl.
*G01F 23/296* (2022.01)
*G01S 7/521* (2006.01)
*G01S 15/08* (2006.01)
*G01S 15/58* (2006.01)
*G01S 15/88* (2006.01)
*G10K 11/00* (2006.01)
*B06B 1/06* (2006.01)

(52) U.S. Cl.
CPC .......... *G01F 23/2968* (2013.01); *G01S 7/521* (2013.01); *G01S 15/08* (2013.01); *G01S 15/58* (2013.01); *G01S 15/88* (2013.01); *G10K 11/004* (2013.01)

(58) Field of Classification Search
USPC .......................................................... 73/632
See application file for complete search history.

(56) References Cited

U.S. PATENT DOCUMENTS

| | | | |
|---|---|---|---|
| 5,664,456 A * | 9/1997 | Eckert | G01F 23/2962 310/326 |
| 5,906,580 A | 5/1999 | Kline-Schoder et al. | |
| 5,962,790 A | 10/1999 | Lynnworth et al. | |
| 6,269,457 B1 * | 7/2001 | Lane | G06F 11/3688 714/48 |
| 7,075,215 B2 * | 7/2006 | Yogeswaren | G01V 1/186 310/334 |
| 7,522,475 B2 | 4/2009 | Kojima et al. | |
| 2004/0028118 A1 | 2/2004 | Sidoni | |
| 2011/0118995 A1 * | 5/2011 | Berger | B06B 3/00 702/48 |

FOREIGN PATENT DOCUMENTS

| | | |
|---|---|---|
| CN | 104748803 A | 7/2015 |
| CN | 104837569 A | 8/2015 |
| CN | 105073280 A | 11/2015 |
| CN | 205748512 U | 11/2016 |
| DE | 19724189 A1 | 12/1998 |
| DE | 102007039598 A1 | 4/2008 |
| DE | 102009046862 A1 | 5/2011 |
| DE | 102015107567 A1 | 11/2016 |
| JP | 2015059899 A | 3/2015 |

* cited by examiner

ULTRASOUND TRANSDUCER

CROSS-REFERENCE TO RELATED APPLICATIONS

The present application is related to and claims the priority benefit of German Patent Application No. 10 2017 111 624.9, filed on May 29, 2017, and International Patent Application No. PCT/EP2018/062025 filed on May 9, 2018, the entire contents of which are incorporated herein by reference.

TECHNICAL FIELD

The invention relates to an ultrasound transducer of measuring and automation technology for determining or monitoring a measured variable.

BACKGROUND

Ultrasound transducers have long been the state of the art and are subject to constant adjustment to technical requirements and general improvement. An acoustic matching of the ultrasound transducer to the medium with which the ultrasound transducer interacts is important for good transmitting and receiving performance. Through acoustic matching, for example, the proportion of ultrasonic signal energy reflected at an interface medium ultrasound transducer in a total energy is reduced, which improves the transmission and reception efficiency. At the same time, this matching has a positive effect on a signal-to-noise ratio, since reflected signal components have fewer disrupting effects due to their lower energy.

The publication DE102009046862A1 proposes a coupling element of an ultrasound transducer of an ultrasonic flow meter, which ensures an acoustic matching of the ultrasound transducer to a medium. The coupling element has a large number of bundled bars, which bars taper towards the medium at one end, wherein the taper is responsible for the acoustic matching. A disadvantage of the proposed solution is a low mechanical stability of the bundle and an extension in the direction of the longitudinal axis of the bars.

SUMMARY

Therefore, the aim of the invention is to propose an ultrasound transducer with a compact and mechanically robust coupling element, and an ultrasonic measuring device with such an ultrasound transducer.

The aim is achieved by an ultrasound transducer according to independent claim 1, an ultrasonic flow meter according to claim 14, and an ultrasonic measuring device according to claim 15.

An ultrasound transducer of measuring and automation technology according to the invention for the determination or monitoring a measured variable comprises at least one transducer element, in particular, a piezo transducer element, for transmitting or receiving ultrasonic signals;

a matching element acoustically coupled to the transducer element and with a first side turned towards the transducer element and a second side turned away from the transducer element, wherein the matching element is configured to ensure an acoustic matching between the transducer element and a medium acting on the matching element, wherein the matching element has a first longitudinal axis and an axial extent relative to the first longitudinal axis, and wherein the matching element is configured to transmit ultrasonic signals between the first side and the second side of the matching element, and vice versa, wherein the matching element, in a first subregion of the axial extent, partially fills each cross-section of the matching element, wherein a filling component in the first subregion along the first longitudinal axis monotonically increases in the direction of the first side, wherein the matching element has, in the first subregion, a plurality of ring elements arranged concentrically around the first longitudinal axis, and wherein, in the first subregion, each ring element partially fills each cross-section, wherein the first subregion comprises at least 60%, and, in particular, at least 80%, of an axial extent of the matching element along the first longitudinal axis.

The monotonic increase in the filling component ensures impedance matching between the first side of the matching element and the second side of the matching element. The fact that each ring element extends over the entire first subregion enables a compact structure of the matching element. The volume not filled by the ring elements may be filled by a gas, a liquid, or another solid. Low pressure or a vacuum can also be arranged in the volume.

Thereby, at least the ring elements are made of at least one material from the following list: metal such as stainless steel or titanium, glass, ceramic.

In one configuration, in a second subregion of the axial extent turned towards the second side and terminating the second side, the matching element fills a cross-section of the matching element at least to 90%, and, in particular, at least to 95% and preferably at least to 97%.

The at least almost complete filling of the cross-section in the second subregion enables an efficient transition of ultrasonic signals between the transducer element and the medium, and vice versa. Ideally, an axial extent of the second subregion is less than the wavelength of the ultrasonic signals in the medium.

In one configuration, in a third subregion of the axial extent turned towards the first side and terminating the first side, the matching element completely fills a cross-section of the matching element.

In one configuration, each of the ring elements has a second base element on a side turned towards the medium, which second base elements at least partially form the second subregion, and/or the ring elements have a first base element on a side turned towards the transducer element, which first base elements at least partially form the third subregion.

In one configuration, the third subregion is formed at least in part by at least one of the following elements: solder layer, welding layer, adhesive layer, first plate, wherein the first plate is essentially perpendicular to the longitudinal axis. Thereby, the first plate can comprise an elastomer or a soft metal.

The ring elements may, for example, also be pressed against a housing wall or against a transducer element in the event of plastic deformation of the third subregion, in order to improve the transmission of ultrasonic signals. This can be ensured, for example, by an easily deformable third subregion.

In one configuration, the second subregion is formed along the first longitudinal axis, at least in sections, from a second plate, and is in contact with the ring elements, wherein the second plate is essentially perpendicular to the first longitudinal axis.

Thereby, the ring elements may be connected to the second plate by a bonding process, such as soldering, gluing, or welding. Alternatively or additionally, a positively locking connection of the ring elements with the plate, e.g., through recesses in the plate, can be established.

The area of the matching element in contact with the medium may be provided with a protective coating. The coating may preferably be made of a precious metal, stainless steel, plastic such as a chemically-resistant polymer, or a ceramic. With abrasive media, a hard (for example, ceramic) coating or a metal oxide coating is advantageous.

In one configuration, the matching element has pressure equalization openings that are arranged in the ring elements and/or in the second subregion and/or in a sheathing of the matching element.

Pressure equalization openings, for example, can be arranged in the form of ring-shaped columns in the second subregion.

In one configuration, the second side is in contact with the transducer element.

In one configuration, the ultrasound transducer has a housing with a first housing chamber, which is configured to house the transducer element, wherein the transducer element is embedded in the first housing chamber.

In one configuration, the housing has an outer side turned towards the medium, wherein the matching element is arranged on the outside of the housing and is separated from the transducer element by a housing wall.

In one configuration, the housing has a second housing chamber, which is separated from the first housing chamber by a media-tight inner wall, wherein the matching element is arranged on a side, turned towards the medium, of the inner wall, and wherein the transducer element is arranged on a side, turned away from the medium, of the inner wall, wherein the housing chamber at least partially encloses the matching element in the axial direction with respect to the first longitudinal axis in the direction of the medium.

In one configuration, the ring elements have, on a side turned towards the transducer element, a first thickness of at least 0.4 mm, and, in particular, at least 0.5 mm and preferably at least 0.6 mm, and/or wherein the ring elements have, on the side turned towards the transducer element, a first thickness of a maximum of 1.5 mm, and, in particular, a maximum of 1.2 mm and preferably a maximum of 1 mm, and/or wherein the ring elements have, on a side turned towards the second subregion, a second thickness of at least 0.005 mm, and, in particular, at least 0.01 mm and preferably at least 0.02 mm, and/or wherein the ring elements have, on the side turned towards the second subregion, a second thickness of a maximum of 0.4 mm, and, in particular, a maximum of 0.3 mm and preferably a maximum of 0.2 mm.

The dimensions specified here refer to an ultrasound transducer that is optimized for ultrasonic signals with a frequency of approximately 1 MHz. Ultrasound transducers, which are optimized for ultrasonic signals with different frequencies and thus with different wavelengths, are subject to dimensions correspondingly matched to the wavelength. As wavelengths increase, the dimensions increase accordingly.

Thereby, a ratio of the first thickness to the second thickness is less than $\frac{1}{2}$, and, in particular, less than $\frac{1}{5}$ and preferably less than $\frac{1}{20}$.

The first thickness is preferably less than $\frac{1}{3}$, and, in particular, less than $\frac{1}{5}$, of the axial extent of the matching element.

In one configuration, a radial spacing of the ring elements on the side turned towards the transducer element is at least 0.02 mm, and, in particular, 0.05 mm and preferably at least 0.1 mm.

In one configuration, the matching element has an axial extent of at least 3 mm, and, in particular, at least 5 mm and preferably at least 7 mm, and/or wherein the matching element has an axial extent of a maximum of 30 mm, and, in particular, a maximum of 25 mm and preferably a maximum of 20 mm.

In one configuration, the matching element is produced at least in part by means of at least one of the following manufacturing processes:

sintering, laser sintering, casting, injection molding, 3-D printing.

An ultrasonic flow meter according to the invention for measuring the volume flow rate or the flow velocity of a medium flowing through a measuring tube with at least one ultrasound transducer according to the invention, has a measuring tube for guiding the medium, wherein the at least one ultrasound transducer is mounted in a wall of the measuring tube, and wherein the flow meter has an electronic operating circuit for operating the ultrasound transducer.

An ultrasonic measuring device according to the invention for measuring the fill-level of a medium contained in a container or an ultrasonic distance meter with at least one ultrasound transducer according to the invention has an electronic operating circuit for operating the ultrasound transducer, wherein the ultrasound transducer is mounted in a wall of the container.

BRIEF DESCRIPTION OF THE DRAWING

In the following, the invention is described on the basis of the exemplary embodiments shown in the drawings.

FIGS. 3 a) to 3 d) sketch schematic, exemplary cross-sections through ultrasound transducers, each with a matching element according to the present disclosure;

FIG. 4 a) sketches a schematic, exemplary cross-section through an ultrasonic flow meter; and FIG. 4 b) shows a schematic, exemplary cross-section through an ultrasonic fill-level meter.

DETAILED DESCRIPTION

Figure 1:
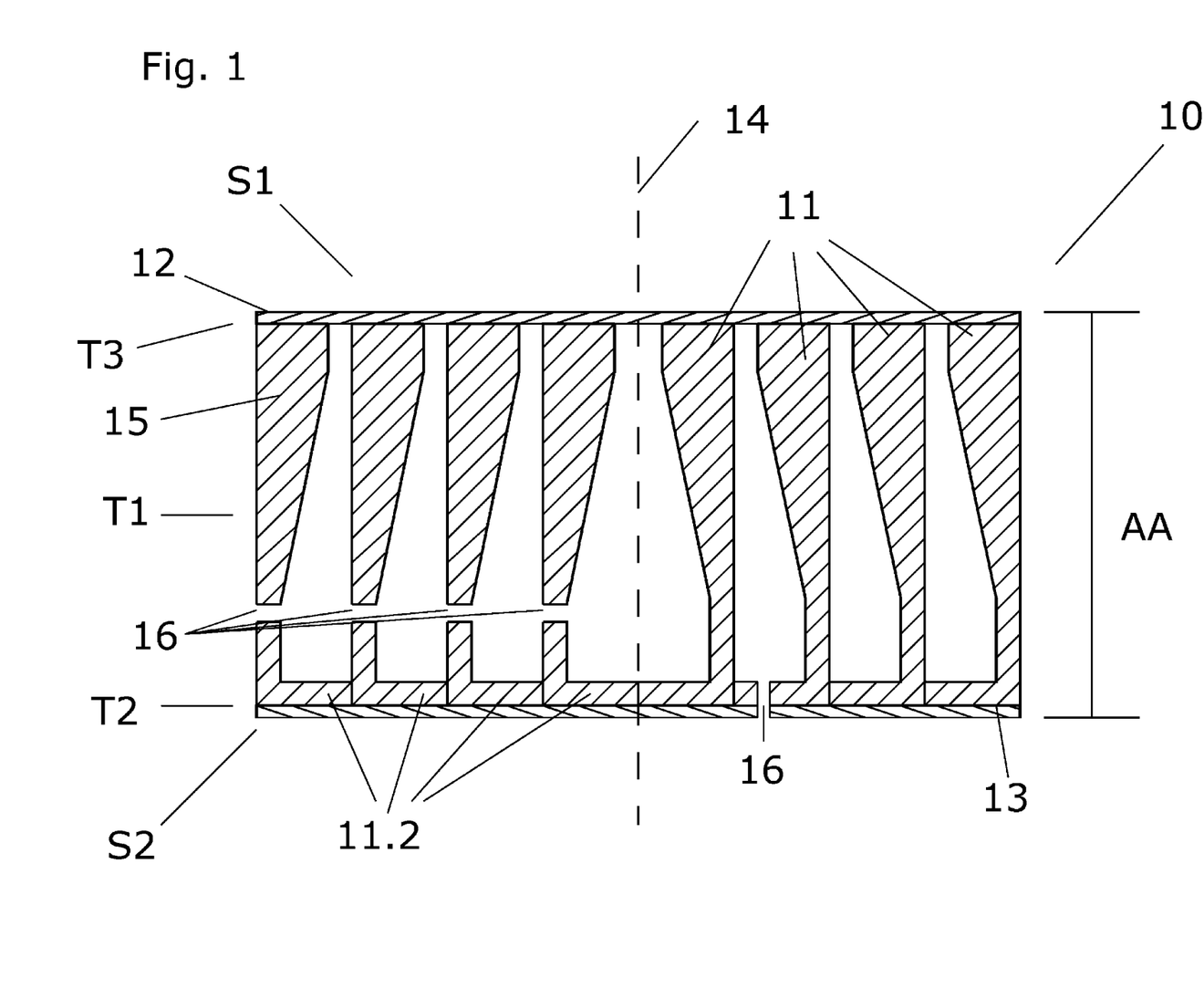
FIG. 1 sketches a schematic, exemplary cross-section through a matching element according to the present disclosure.

FIG. 1 sketches a cross-section through a matching element 10 according to the invention, which matching element has several ring elements 11, which are arranged concentrically around a first longitudinal axis 14, wherein an outer ring element is a sheathing 15 of the matching element. As shown in this exemplary embodiment, the ring elements can have second base elements 11.2 on a second side S2 turned towards a medium, which extend perpendicular to the first longitudinal axis and are in fixed connection with adjacent ring elements 11. The connection between the ring elements by means of the second base elements 11.2 can be a soldered, welded, or glued connection. In addition, as shown in this exemplary embodiment, the second side of the matching element may be terminated by a second plate 13 which is connected to the ring elements 11. In the event that second base elements 11.2 are not present, the ring elements can, for example, engage in a positively locking manner in recesses (not shown) in the second plate 13. The connection between the ring elements and the second plate can, alternatively or complementarily, also be a soldered, welded, or glued connection. In the event that base elements 11.2 are present, the connection between the ring elements and the second plate is preferably a soldered, welded, or glued connection. Alternatively or additionally, the base elements or the second plate may be provided with a coating on the medium side, in order to protect the matching element from the medium. Protection against acidic or alkaline media, for example, can be ensured by a precious metal or a chemically-resistant polymer or ceramic. With abrasive media, a hard (for example, ceramic) coating or a metal oxide coating is advantageous.

In the direction of a side S1 turned towards a transducer element 20 (see FIG. 2), the ring elements have a monotonically increasing cross-sectional area in a first subregion along the first longitudinal axis, wherein the first subregion occupies at least 50%, and, in particular, at least 60% and preferably at least 80%, of an axial extent AA of the matching element. The matching element is terminated on the second side S2 by a second subregion T2, in which the matching element fills a cross-section of the matching element at least to 95% and, in particular, at least to 98%.

Figure 3:
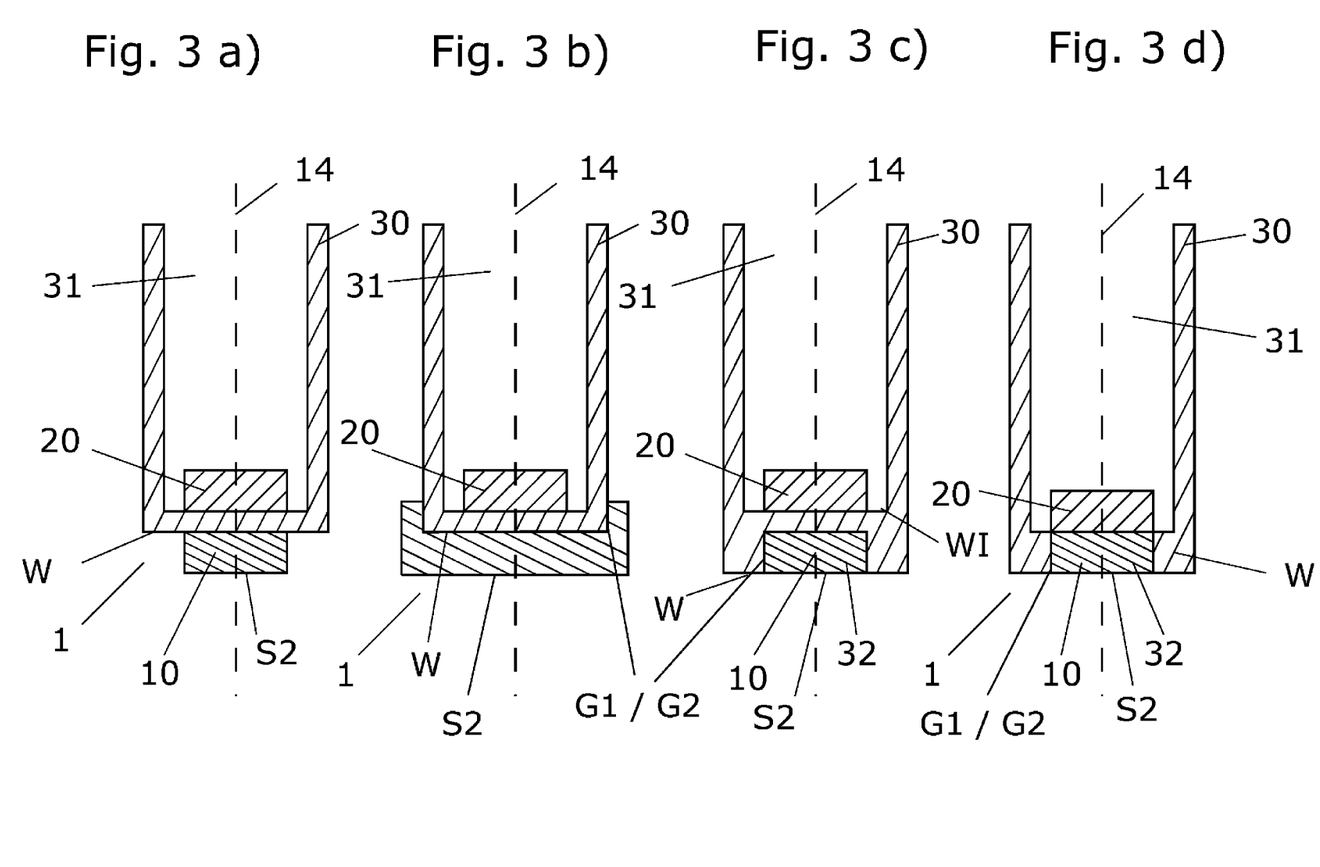

The first side S1 of the matching element is configured to be connected to a housing 30 of the ultrasound transducer or to the transducer element 20, e.g., by gluing or welding or soldering; see FIG. 3 a) through FIG. 3 d). In this exemplary embodiment, the first side of the matching element is terminated in a third subregion T3 by a solder layer, a welding layer, an adhesive layer, or a first plate 12. Alternatively, the first subregion may be connected directly to the housing or the transducer element.

The monotonically increasing filling of the cross-sections of the matching element in the first subregion T1 in the direction of the first side S1 is caused by an increase in the thickness of the ring elements, which ring elements are configured to transmit sound signals between the first side S1 and the second side S2, and vice versa. Sound signals passing through the matching element cause a deflection of the ring elements in the direction of the first longitudinal axis, wherein a local deflection of the ring elements depends upon a local sound energy and on a local thickness of the ring elements, wherein an increasing thickness is accompanied by a decrease in the local axial deflection. Since the amplitude of a deflection at a given sound energy is a function of the acoustic impedance of a medium or an object, changing the thickness of the ring elements, and thus changing the amplitude of the local axial deflection of the ring elements along the first longitudinal axis, ensures an impedance matching between a medium, acting on the second side, and the side of the matching element turned towards the transducer element.

Since ultrasound transducers according to the invention are used under different conditions, it may be sensible to provide pressure equalization openings 16 to the first subregion, which pressure equalization openings are arranged in the ring elements and/or in the second side. Thereby, the pressure equalization openings are small and occupy less than 5%, and, in particular, less than 2%, of the cross-sectional area of the matching element in the second subregion. For example, pressure equalization openings in the second subregion could be ring-shaped gaps between the second base elements. With the definition given above of the first subregion on the basis of the monotonic increase in the cross-sectional area of the matching element, pressure equalization openings in the ring elements are not to be taken into account. Other than as shown in FIG. 1, the ring elements do not have to be uniform, nor does the orientation or geometric configuration of the second base elements have to be the same. In addition to or as an alternative to the solder layer, welding layer, adhesive layer, or first plate 12, the ring elements on the first side S1 in the third subregion can also have first base elements that, like the second base elements, establish a connection to adjacent ring elements.

Figure 2:
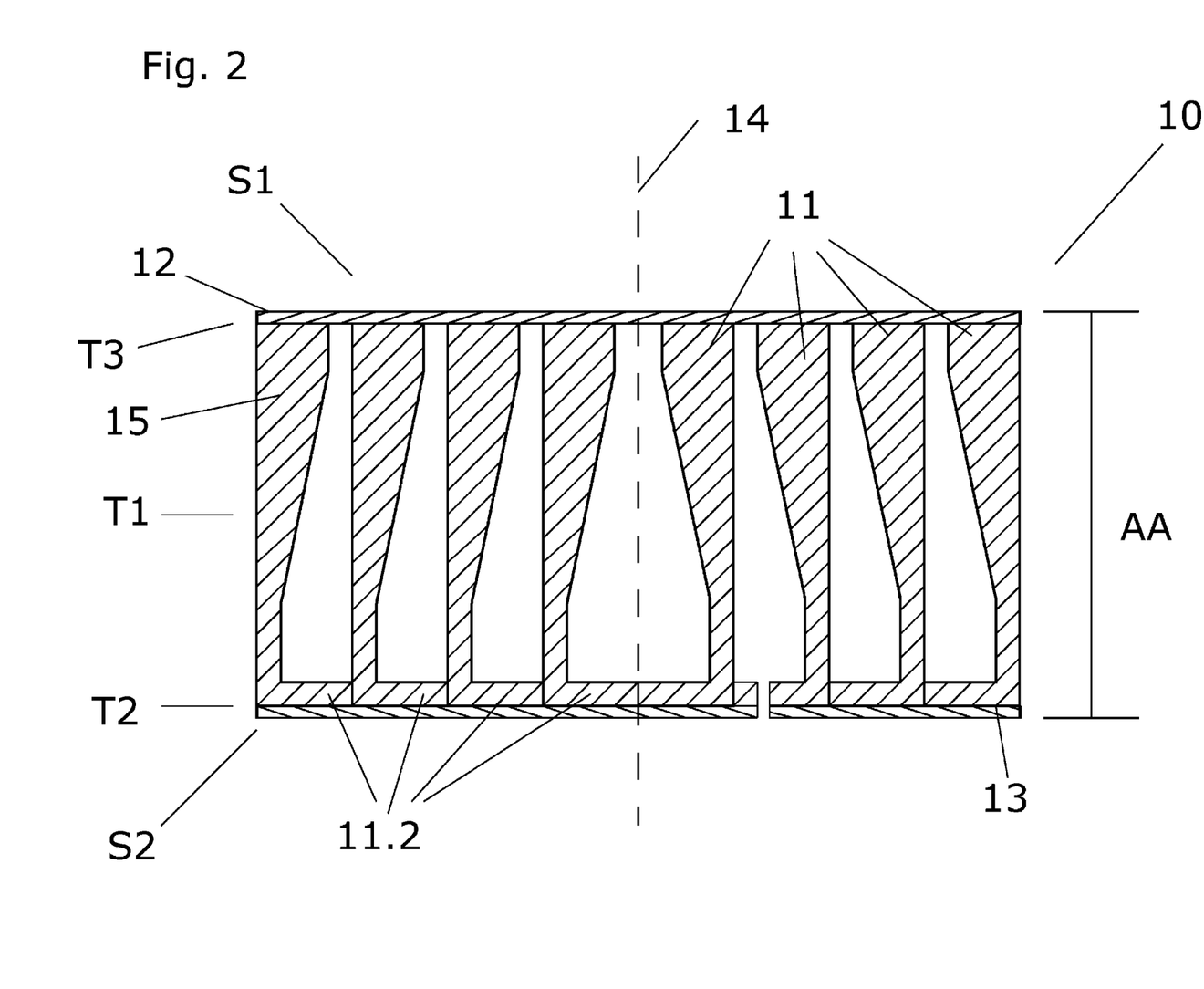
FIG. 2 sketches a schematic, exemplary cross-section through another matching element according to the present disclosure.

FIG. 2 sketches a cross-section through a matching element according to the invention according to FIG. 1, but without pressure equalization openings.

FIGS. 3 a) to 3 d) sketch cross-sections of three exemplary versions of an ultrasound transducer, each with a matching element according to the invention. FIG. 3 a) shows an ultrasound transducer with a housing 30 and a first housing chamber 31, in which housing chamber the transducer element 20 is arranged. The matching element is arranged on the outside of a housing wall W on a side opposite the transducer element. Sound signals that travel from transducer element 20 to matching element 10 or vice versa pass through the media-tight housing wall.

FIG. 3 b) sketches a variant of the ultrasound transducer shown in FIG. 3 a), wherein the matching element is screwed via a first thread G1 to a second thread G2 of the housing wall.

FIG. 3 c) sketches an ultrasound transducer in which the transducer element 20 is arranged in a second housing chamber 32 of the housing 30, and wherein the transducer element and the matching element are separated by a media-tight inner wall WI. Such configuration enables the transducer element to be securely mounted to or inside the housing and is therefore particularly suitable for flow measurements.

FIG. 3 d) sketches an additional variant of an ultrasound transducer, wherein the matching element 10 is arranged in the wall W of the housing, wherein the matching element and the transducer element are not separated by the housing wall W.

As shown in FIGS. 3 b) through 3 d), the mounting of the matching element to the housing can be ensured, additionally or alternatively, via a screw connection, wherein the housing has a second thread G2, and the transducer element has a thread G1 complementary thereto. However, as in FIG. 3 a), the mounting can also be ensured without a screw connection only by means of gluing, welding, or soldering, for example.

In addition, the media-tight inner wall can be adapted to current explosives requirements or pressure equipment guidelines with regard to wall thickness and the selection of materials.

Figure 4:
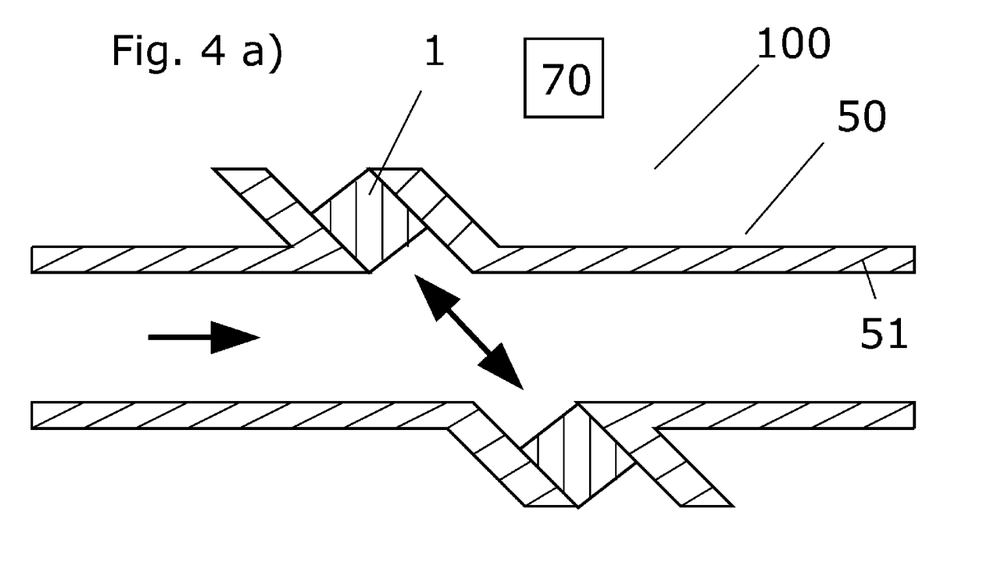

FIG. 4 a) sketches an exemplary ultrasonic flow meter 100 that operates according to the transit time or transit time difference principle, wherein the ultrasonic flow meter has two ultrasound transducers 1 according to the invention, which are arranged in a measuring tube wall 51 of a measuring tube 50; and an electronic measuring/operating circuit 70 for operating the ultrasound transducers, which electronic measuring/operating circuit is connected to the ultrasound transducers 1 by means of electrical connections (not shown for reasons of clarity). Ultrasonic signals emitted by the ultrasound transducers travel through the medium obliquely to a direction of propagation of the medium in the measuring tube and undergo a direction-dependent change in transit time, which can be used to determine a flow measured value by the electronic measuring/operating circuit 70. Alternatively, an exemplary ultrasonic flow meter can also operate according to the Doppler principle. In this case, only a single ultrasound transducer is required.

FIG. 4 b) sketches an exemplary ultrasonic fill-level meter 110 with a container 60, an ultrasound transducer 1 according to the invention arranged in a container wall 60, and an electronic measuring/operating circuit 70 for operating the ultrasound transducer. The ultrasound transducer 1 is configured to transmit ultrasonic signals, and to receive ultrasonic signals reflected back from a boundary surface of a medium in the container. The fill-level of the medium can be calculated from the signal propagation time using the electronic measuring/operating circuit. The ultrasound transducer can, for example, also be arranged in the container wall in such a way that the ultrasonic signals pass through the medium prior to reflection at a boundary surface of the medium.

As with an ultrasonic fill-level meter, an ultrasound transducer can also be used as an ultrasonic distance meter.

The invention claimed is:

1. An ultrasound transducer of measuring and automation technology for determining or monitoring a measured variable, comprising:
   at least one transducer element for transmitting or receiving ultrasonic signals; and
   a matching element acoustically coupled to the transducer element and having a first side turned towards the transducer element and a second side turned away from the transducer element, wherein the matching element is configured to ensure an acoustic matching between the transducer element and a medium acting on the matching element;
   wherein the matching element has a first longitudinal axis and an axial extent relative to the first longitudinal axis;
   wherein the matching element is configured to transmit ultrasonic signals between the first side and the second side of the matching element, and vice versa;
   wherein the matching element, in a first subregion of the axial extent, partially fills each cross-section of the matching element, wherein a filling component in the first subregion along the first longitudinal axis monotonically increases in the direction of the first side;
   wherein the matching element has, in the first subregion, a plurality of ring elements arranged concentrically around the first longitudinal axis;
   wherein, in the first subregion, each ring element partially fills each cross-section; and
   wherein the first subregion comprises at least 60% of an axial extent of the matching element along the first longitudinal axis.

2. The ultrasound transducer of claim 1, wherein, in a second subregion of the axial extent turned towards the second side and terminating the second side, the matching element fills a cross-section of the matching element at least to 90%.

3. The ultrasound transducer of claim 2, wherein, in a third subregion of the axial extent turned towards the first side and terminating the first side, the matching element completely fills a cross-section of the matching element.

4. The ultrasound transducer of claim 3, wherein each of the ring elements has a second base element on a side turned towards the medium, which second base elements at least partially form the second subregion, or wherein the ring elements have a first base element on a side turned towards the transducer element, which first base elements at least partially form the third subregion.

5. The ultrasound transducer of claim 3, wherein the third subregion is at least partially formed by at least one of the following elements: solder layer, weld layer, adhesive layer, sinter layer, and first plate, wherein the first plate is essentially perpendicular to the longitudinal axis.

6. The ultrasound transducer of claim 2, wherein the second subregion is formed along the first longitudinal axis, at least in sections, from a second plate, which plate is in contact with the ring elements, wherein the second plate is essentially perpendicular to the first longitudinal axis.

7. The ultrasound transducer of claim 2, wherein the ring elements, in the first subregion, have, on a side turned towards the transducer element, a first thickness of at least 0.4 mm or wherein the ring elements have, on the side turned towards the transducer element, a first thickness of a maximum of 1.5 mm or wherein the ring elements have, on a side turned towards the second subregion, a second thickness of at least 0.005 mm or wherein the ring elements have, on the side turned towards the second subregion, a second thickness of a maximum of 0.4 mm.

8. The ultrasound transducer of claim 7, wherein a radial spacing of the ring elements on the side turned towards the transducer element is at least 0.02 mm.

9. The ultrasound transducer of claim 1, wherein the matching element has pressure equalization openings that are arranged in the ring elements or in the second subregion or in a sheathing of the matching element.

10. The ultrasound transducer of claim 1, wherein the second side is in contact with the transducer element.

11. The ultrasound transducer of claim 1, wherein the ultrasound transducer has a housing with a first housing chamber, which housing is configured to accommodate the transducer element, wherein the transducer element is arranged in the first housing chamber.

12. The ultrasound transducer of claim 11, wherein the housing has an outer side turned towards the medium, wherein the matching element is arranged on the outside of the housing and is separated from the transducer element by a media-tight housing wall.

13. The ultrasound transducer of claim 11, wherein the housing has a second housing chamber, which is separated from the first housing chamber by a media-tight inner wall, wherein the matching element is arranged on a side, turned towards the medium, of the inner wall and wherein the transducer element is arranged on a side, turned away from the medium, of the inner wall, wherein the second housing chamber at least partially encloses the matching element in the axial direction with respect to the first longitudinal axis in the direction of the medium.

14. An ultrasonic flow meter for measuring the volume flow rate or the flow velocity of a medium flowing through a measuring tube, including:
   at least one ultrasound transducer, including:
      at least one transducer element for transmitting or receiving ultrasonic signals; and
      a matching element acoustically coupled to the transducer element and having a first side turned towards the transducer element and a second side turned away from the transducer element, wherein the matching element is configured to ensure an acoustic matching between the transducer element and a medium acting on the matching element;

wherein the matching element has a first longitudinal axis and an axial extent relative to the first longitudinal axis;

wherein the matching element is configured to transmit ultrasonic signals between the first side and the second side of the matching element, and vice versa;

wherein the matching element, in a first subregion of the axial extent, partially fills each cross-section of the matching element, wherein a filling component in the first subregion along the first longitudinal axis monotonically increases in the direction of the first side;

wherein the matching element has, in the first subregion, a plurality of ring elements arranged concentrically around the first longitudinal axis;

wherein, in the first subregion, each ring element partially fills each cross-section; and wherein the first subregion comprises at least 60% of an axial extent of the matching element along the first longitudinal axis;

wherein the flow meter has a measuring tube for guiding the medium, wherein the at least one ultrasound transducer is mounted in a wall of the measuring tube, and wherein the flow meter has an operating circuit for operating the ultrasound transducer.

15. An ultrasonic fill-level meter for measuring the fill-level of a medium located in a container or ultrasonic distance meter, including:

at least one ultrasound transducer, including:

at least one transducer element for transmitting or receiving ultrasonic signals; and a matching element acoustically coupled to the transducer element and having a first side turned towards the transducer element and a second side turned away from the transducer element, wherein the matching element is configured to ensure an acoustic matching between the transducer element and a medium acting on the matching element;

wherein the matching element has a first longitudinal axis and an axial extent relative to the first longitudinal axis;

wherein the matching element is configured to transmit ultrasonic signals between the first side and the second side of the matching element, and vice versa;

wherein the matching element, in a first subregion of the axial extent, partially fills each cross-section of the matching element, wherein a filling component in the first subregion along the first longitudinal axis monotonically increases in the direction of the first side;

wherein the matching element has, in the first subregion, a plurality of ring elements arranged concentrically around the first longitudinal axis;

wherein, in the first subregion, each ring element partially fills each cross-section; and wherein the first subregion comprises at least 60% of an axial extent of the matching element along the first longitudinal axis;

wherein the ultrasound transducer is mounted in a wall of the container or in a holder of the ultrasonic distance meter, and wherein the fill-level meter or the ultrasonic distance meter has an electronic measuring/operating circuit for operating the ultrasound transducer.

\* \* \* \* \*